W. H. SELLERS, Jr.
SWEEP RAKE.
APPLICATION FILED JULY 29, 1913.

1,093,487.

Patented Apr. 14, 1914.

WITNESSES
F. C. Barry
Myron J. Clear.

INVENTOR
William H. Sellers, Jr.
BY Munn & Co.
ATTORNEYS

UNITED STATES PATENT OFFICE.

WILLIAM H. SELLERS, JR., OF FLORENCE, KANSAS.

SWEEP-RAKE.

1,093,487. Specification of Letters Patent. Patented Apr. 14, 1914.

Application filed July 29, 1913. Serial No. 781,791.

*To all whom it may concern:*

Be it known that I, WILLIAM H. SELLERS, Jr., a citizen of the United States, and a resident of Florence, in the county of Marion and State of Kansas, have made certain new and useful Improvements in Sweep-Rakes, of which the following is a specification.

My present invention relates to sweep rakes utilized to take hay from windrows and deliver it on the teeth of a stacker, and the object of my invention is to provide the teeth of the sweep rake with means whereby the hay may be sufficiently compressed and packed on the stacker as to prevent it from falling or pulling away with the sweep rake when the latter is withdrawn.

A further object of my invention is to provide such means in the form of simple, inexpensive and durable castings which may be secured in connection with the teeth of sweep rakes now in use.

Figure 1:
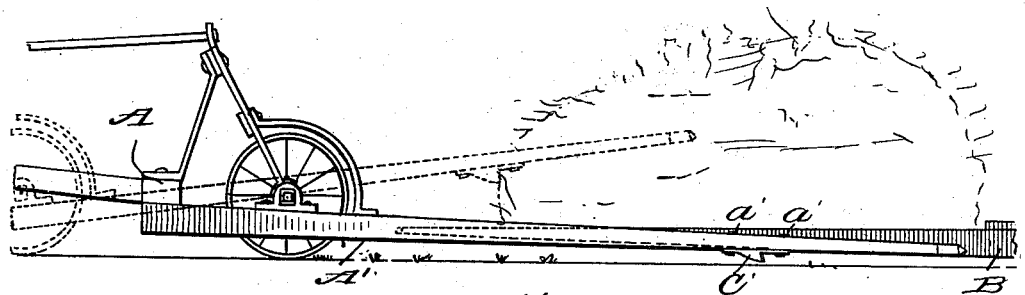
Figure 2:
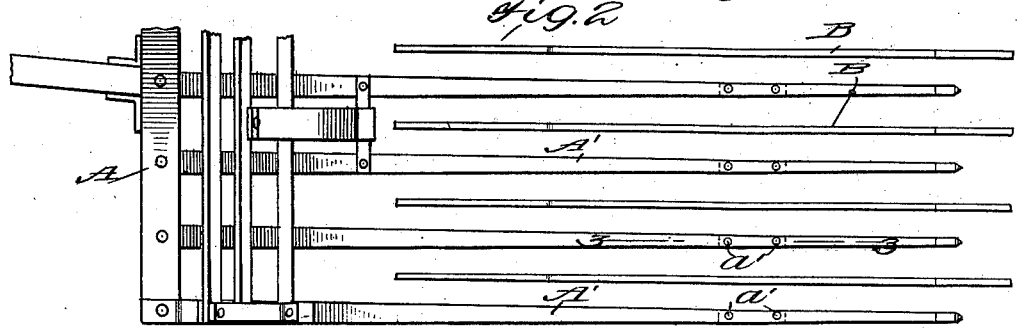
Figure 3:
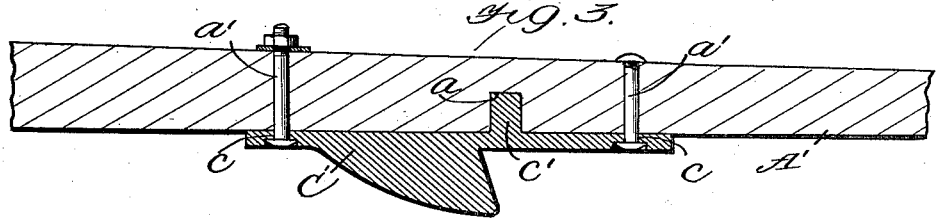

In the accompanying drawings, which illustrate my invention: Figure 1 is a side elevation illustrating the practical application of my invention: Fig. 2 is a plan view of certain of the teeth of the sweep rake and the forward portion of its frame, Fig. 3 is a vertical longitudinal section through one of the sweep rake teeth taken substantially on line 3—3 of Fig. 2, and Fig. 4 is a detail perspective view of one of the castings removed.

Referring now to these figures, I have indicated a sweep rake generally at A, the forwardly projecting teeth A' of which may be raised and lowered, and in their lowered position are adapted to collect hay from windrows and to deliver the hay upon the stacker teeth indicated at B, between which stacker teeth the sweep rake teeth A' are adapted to extend as particularly seen by comparison of Figs. 1 and 2.

Subsequent to the deposit of hay upon the stacker teeth, it is customary for the sweep rake to be withdrawn, the object being of course, to leave the hay upon the stacker teeth, but in doing this it often, and in fact almost invariably happens that a considerable amount of the hay is withdrawn from the stacker teeth, requiring an extra hand to fork the loose hay back thereon.

Figure 4:
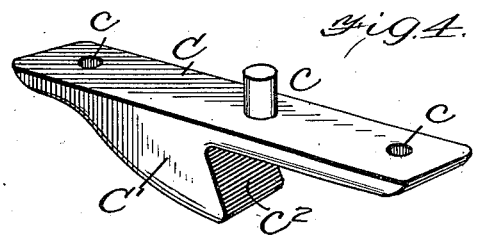

In accordance with my invention, I provide a casting such as shown particularly in Fig. 4, and indicated by the character C, the upper surface of the body of this casting being substantially flat and of a width corresponding to that of each of the sweep rake teeth A'. The body of the casting C is provided adjacent its opposite ends with transverse apertures $c$ and has an intermediate upwardly projecting pin $c'$ which is arranged to fit within a conformable aperture $a$ in each of the sweep rake teeth intermediate its ends, and at a point near the outer end thereof. Thus, each of the castings C may be secured upon the lower surface of a rake tooth and held by means of bolts $a'$ projecting through the apertures $c$ and through similar apertures through the rake teeth. The lower surface of each of the castings C is provided with a depending lug $C'$, the forward surface $c^2$ of which is inclined forwardly and downwardly, whereby to engage and pack the hay pile upon the stacker teeth when the sweep rake has been partially withdrawn and its teeth elevated and thrust forwardly into the hay pile, as particularly shown in dotted lines in Fig. 1. The means which I have shown to perform this function are simple, inexpensive and durable in use, and it may be at once seen that such means do away with the necessity of an extra hand to fork the hay, and may be readily brought into operation when desired.

I claim:—

1. A sweep rake having its teeth provided intermediate their ends with depending lugs, whereby to compress and pack hay when the forward ends of the teeth are thrust into the hay.

2. A sweep rake having a casting secured upon the lower surface of each of its teeth intermediate the ends thereof, said casting having a depending lug, the forward face of which forms a compressing and packing shoulder, for the purpose described.

3. An attachment of the character described comprising a casting having an elongated body provided with transverse apertures adjacent its opposite ends and having a pin projecting from one face intermediate its ends and having a lug also intermediate its ends and projecting from its opposite face, said lug being provided with a flat forward face constituting a compressing and packing shoulder, for the purpose described.

WILLIAM H. SELLERS, JR.

Witnesses:
T. B. GRAHAM,
B. K. GRAHAM.

Copies of this patent may be obtained for five cents each, by addressing the "Commissioner of Patents, Washington, D. C."